United States Patent
Henze et al.

(10) Patent No.: US 8,541,535 B2
(45) Date of Patent: Sep. 24, 2013

(54) THERMOPLASTIC POLYURETHANE CONTAINING SILANE GROUPS

(75) Inventors: Oliver Steffen Henze, Schneidlingen (DE); Sabine Peters, Nortrup (DE); Johann-Diedrich Brand, Lemfoerde (DE); Christa Hackl, Bad Essen (DE); Markus Kraemer, Stemshorn (DE); Klaus Hilmer, Brockum (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 655 days.

(21) Appl. No.: 12/659,629

(22) Filed: Mar. 15, 2010

(65) Prior Publication Data
US 2010/0209643 A1    Aug. 19, 2010

Related U.S. Application Data

(63) Continuation of application No. 10/565,539, filed as application No. PCT/EP2004/007568 on Jul. 9, 2004, now abandoned.

(30) Foreign Application Priority Data

Jul. 25, 2003    (DE) .................................... 10334265

(51) Int. Cl.
  *C08G 18/10*    (2006.01)
  *C08G 18/12*    (2006.01)
(52) U.S. Cl.
  USPC ............... 528/48; 528/28; 528/67; 528/69
(58) Field of Classification Search
  USPC .................. 528/28, 48, 67, 69; 428/36.9
  See application file for complete search history.

(56) References Cited

U.S. PATENT DOCUMENTS

| | | | |
|---|---|---|---|
| 4,345,053 A | 8/1982 | Rizk et al. | |
| 4,810,767 A | 3/1989 | Furukawa et al. | |
| 5,714,257 A | 2/1998 | Shah et al. | |
| 5,760,155 A | 6/1998 | Mowrer et al. | |
| 5,990,257 A | 11/1999 | Johnston et al. | |
| 2002/0169255 A1 | 11/2002 | Lagneaux et al. | |

FOREIGN PATENT DOCUMENTS

| | | |
|---|---|---|
| FR | 2 794 759 | 12/2000 |
| JP | 11-228833 | 8/1999 |
| WO | 00/39179 | 7/2000 |

OTHER PUBLICATIONS

Dassin Stephane et al., Thermoplastic Polyurethanes (TPUs) With Grafted Organosilane Moieties: A New Way of Improving Thermomechanical Behavior, Polymer Engineering and Science, vol. 42, No. 8, pp. 1724-1739 (2002).

*Primary Examiner* — Michael L Leonard
(74) *Attorney, Agent, or Firm* — Oblon, Spivak, McClelland, Maier & Neustadt, L.L.P.

(57) ABSTRACT

The invention relates to a thermoplastic polyurethane comprising the following structural unit:

$$R_2-CO-NH-R-Si(R_1)_{3-x}(OR_1)_x$$

where:

R is an aliphatic, araliphatic, or aromatic organic radical having from 1 to 20 hydrocarbon atoms, $R_1$ is an alkyl radical or aryl radical having from 1 to 10 carbon atoms, $R_2$ is $-NR_3-CO-R_4$ or $-O-R_5-O-$, $R_3$ is a section of the polymer chain of the thermoplastic polyurethane, in particular a radical which derives from the diisocyanate used to prepare the thermoplastic polyurethane, $R_4$ is a section of the polymer chain of the thermoplastic polyurethane, in particular a radical which derives from the following compounds used to prepare the thermoplastic polyurethane: compounds (b) reactive toward isocyanates, or from the chain extender (c), $R_5$ is an alkylene radical having from 2 to 8 carbon atoms, preferably from 3 to 6 carbon atoms, and x is 1, 2 or 3.

12 Claims, No Drawings

THERMOPLASTIC POLYURETHANE CONTAINING SILANE GROUPS

This is a continuation application of U.S. application Ser. No. 10/565,539, filed Jan. 13, 2006, now abandoned, which is a 371 of PCT/EP04/07568 filed on Jul. 9, 2004.

The invention relates to thermoplastic polyurethane, in particular fibers or hoses, in particular compressed-air hoses, comprising the following structural unit:

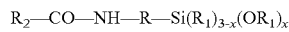

$$R_2\text{—CO—NH—R—Si}(R_1)_{3-x}(OR_1)_x$$

where:
R is an aliphatic, araliphatic, or aromatic organic radical, if appropriate branched-chain, if appropriate unsaturated, preferably a hydrocarbon radical, having from 1 to 20 hydrocarbon atoms, preferably from 2 to 10 hydrocarbon atoms,
$R_1$ is an alkyl radical or aryl radical, preferably an alkyl radical, having from 1 to 10 carbon atoms, preferably from 1 to 6 carbon atoms, particularly preferably methyl and/or ethyl,
$R_2$ is —$NR_3$—CO—$R_4$ or —O—$R_5$—O—,
$R_3$ is a section of the polymer chain of the thermoplastic polyurethane, i.e. in particular a product of the reaction of diisocyanate (a) with compounds (b) reactive toward isocyanates, and chain extender (c), where (b) and (c) preferably have 2 hydroxy groups for the reaction with the diisocyanate, and this reaction product has bonding by way of the hydroxy group of (b) or (c) to the isocyanate (which forms $R_3$, i.e. which is present in $R_3$), where —$NR_3$— is therefore preferably —N(a)-, and therefore in particular a radical which derives from the diisocyanate used to prepare the thermoplastic polyurethane, and in particular is the corresponding radical of MDI,
$R_4$ is a section of the polymer chain of the thermoplastic polyurethane, i.e. in particular a product of the reaction of diisocyanate (a) with compounds (b) reactive toward isocyanates, and chain extender (c), where (b) and (c) preferably have 2 hydroxy groups for the reaction with the diisocyanate, and this reaction product has bonding by way of the hydroxy group of (b) or (c) to the isocyanate (which forms $R_3$, i.e. which is present in $R_3$), where —O—$R_4$ is therefore preferably —O-(b) or —O-(c), and therefore in particular a radical which derives from the chain extender (c) or compounds (b) which are reactive toward isocyanates and which are used to prepare the thermoplastic polyurethane,
$R_5$ is an alkylene radical having from 2 to 8 carbon atoms, preferably from 3 to 6 carbon atoms, and
x is 1, 2 or 3, preferably 2 or 3, particularly preferably 3.

The invention further relates to crosslinked polyurethane obtainable via reaction of the inventive thermoplastic polyurethane with water. The invention further relates to a process for preparing thermoplastic polyurethane which has been silane-modified, modified using organosilicon compounds, i.e. having organosilane groups, and to crosslinkable TPUs thus obtainable, in particular fibers or hoses, in particular compressed-air hoses, and also to the corresponding products crosslinked by way of the silane groups, i.e. the organosilicon groups.

Thermoplastics are plastics which remain thermoplastic when repeatedly heated and cooled within the typical temperature range for the processing and use of the material. Thermoplastic is the term used for the property, possessed by a plastic within a temperature range typical of that plastic, of softening repeatedly when heated and hardening repeatedly when cooled, and being capable, in the softened state, of repeated molding via flow in the form of a molding, extrudate, or formed component, to give a semifinished product or to give final products. Thermoplastics are widespread in industry, and take the form of fibers, sheets, foils, moldings, bottles, sheathing, packaging, etc. Thermoplastic polyurethane (hereinafter termed TPU) is an elastomer with a wide variety of applications, e.g. shoe applications, foils, fibers, skiboots, hoses. However, the advantage which TPUs have through the possibility of thermoplastic processing is at the same time a disadvantage of these materials, because their heat resistance is lower than that of crosslinked polymers. It would therefore be desirable to combine the advantages of thermoplastic processing with those represented by the excellent heat resistance of crosslinked polymers.

US 2002/0169255 and the publication by S. Dassin et al. in Polymer Engineering and Science, August 2002, Vol. 42, No. 8, teach, in the context of this objective, modification of a thermoplastic polyurethane with a silane, the silane being coupled to the polyurethane by means of a crosslinking agent. Hydrolysis of the silane then, e.g. after shaping, crosslinks the initially thermoplastic polyurethane. A disadvantage of this technical teaching is that a series of individual steps is required to obtain the crosslinked TPU. For example, two reactions are required, starting from the thermoplastic polyurethane, firstly with the crosslinking agent, and secondly with the silane. According to US 2002/0169255, the use of the crosslinking agent which links the silane to the TPU is a requirement, because direct use of the silane is said to lead to degradation of the TPU.

It is an object of the present invention to develop a thermoplastic polyurethane, and in particular to develop fibers based on thermoplastic polyurethane, where the polyurethane comprises silane groups, these materials being obtainable through a simple, rapid, and convenient production process, and having excellent crosslinking properties, and, in particular when used as fibers, having a very good level of properties in the crosslinked state.

We have found that this object is achieved by way of the thermoplastic polyurethanes described at the outset and their crosslinked products of reaction with water.

Particular methods of introducing the inventive structural units described at the outset into the TPU consist in using a silane prior to completion of the preparation of the TPU, where this silane has an isocyanate group, or linking this type of silane to a previously prepared TPU. For the purposes of this specification, the term "silane" in particular means organosilicon compounds. This means that for the purposes of this specification organosilicon compounds are also termed silanes. Silanes used may comprise conventional silanes which have an isocyanate group and have at least one, preferably from one to ten, particularly preferably one, silane group. Preference is given to alkoxysilanes. These silanes may have the following structure:

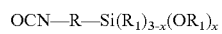

$$OCN\text{—R—Si}(R_1)_{3-x}(OR_1)_x$$

where:
R is an aliphatic, araliphatic, or aromatic organic radical, if appropriate branched-chain, if appropriate unsaturated, preferably a hydrocarbon radical, having from 1 to 20 hydrocarbon atoms, preferably from 2 to 10 hydrocarbon atoms,
$R_1$ is an alkyl radical or arayl radical having from 1 to 10 carbon atoms, preferably from 1 to 6 carbon atoms, preferably methyl and/or ethyl,
x is 1, 2 or 3, preferably 2 or 3, particularly preferably 3, where the 3 alkyl radicals indicated by R and present in the silane may be identical with one another or differ from one another, and are preferably identical.

This means that the compound used to introduce the silane into the TPU may be incorporated directly into the polyurethane. In contrast to the teaching of US 2002/0169255 and of the publication by S. Dassin et al. in Polymer Engineering and Science, August 2002, Vol. 42, No. 8, it is not linked indirectly to the TPU by way of a crosslinking agent, but is present in the TPU structure itself.

A further object was to develop an improved, simpler, quicker, and more cost-effective process for preparing crosslinkable TPUs, in particular a process for preparing thermoplastic polyurethane which has been silane-modified, i.e. has silane groups.

We have found that this object is achieved by using, during the preparation of the thermoplastic polyurethane, a silane which has an isocyanate group, preferably a silane which has an isocyanate group and has at least one, preferably from one to ten, particularly preferably one, silane group, particularly preferably a silane of the following formula:

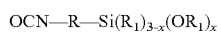
OCN—R—Si(R$_1$)$_{3-x}$(OR$_1$)$_x$ where:
R is an aliphatic, araliphatic, or aromatic organic radical, if appropriate branched-chain, if appropriate unsaturated, preferably an aliphatic hydrocarbon radical, having from 1 to 20 hydrocarbon atoms, preferably from 2 to 10 hydrocarbon atoms, R$_1$ is an alkyl radical having from 1 to 10 carbon atoms, preferably from 1 to 6 carbon atoms, preferably methyl and/or ethyl, x is 1, 2 or 3, preferably 2 or 3, particularly preferably 3, where the 3 alkyl radicals indicated by R and present in the silane may be identical with one another or differ from one another, and are preferably identical.

The organosilicon compounds which have an isocyanate group preferably comprise at least one of the following compounds: γ-isocyanatopropyltrimethoxysilane, isocyanatomethyltrimethoxysilane, γ-isocyanatopropyltriethoxysilane, and/or isocyanatomethyltriethoxysilane, particularly preferably γ-isocyanatopropyltrimethoxysilane, and/or γ-isocyanatopropyltriethoxysilane.

A feature of the inventive process is that the silane group can be introduced directly before the TPU preparation process is complete. There is no requirement for complicated additional steps, such as the reaction of a finished TPU with isocyanates and subsequent reaction of the isocyanate-modified TPU with silanes, e.g. as in the teaching of US 2002/0169255. Surprisingly, it has been found that the silane groups which are integrated into the TPU before the preparation process is complete do not cause premature crosslinking during the further treatment of the TPU prior to the actual shaping process. This is surprising because some TPU processes, such as underwater pelletization, take place if appropriate in the presence of moisture, and may be followed by high-temperature drying. These conditions with moisture and heat usually promote the crosslinking reaction of the silanes, whereas this is undesirable until the actual shaping is complete, i.e. after extrusion, injection molding, or spinning.

According to the invention, therefore, the silanes may be incorporated before the process of preparing the TPUs has been completed. Use may be made here of silanes which have one isocyanate group. Even when use is made of silanes which have one isocyanate group, these "monofunctional" isocyanates do not have any substantial adverse effect on the process of preparing the TPUs. The thermoplastic polyurethane is preferably prepared via reaction of (a) isocyanates, and also silane which has an isocyanate group, with (b) compounds reactive toward isocyanates and having a molar mass of from 500 to 10000, and with (c) chain extenders having a molar mass of from 50 to 499, if appropriate in the presence of (d) catalysts, and/or of (e) conventional additives, where the ratio of the entirety of the isocyanate groups in component (a) to the entirety of the functions present in components (b) and (c), and also, if appropriate, (d) and (e), and reactive toward isocyanates is from 0.9:1 to 1.1:1, particularly preferably from 0.95:1 to 1.05:1, in particular 1:1. The ratio here of the entirety of the isocyanate groups in component (a) and of the isocyanate groups in the silanes to the entirety of the functions present in components (b) and (c), and also, if appropriate, (d) and (e), and reactive toward isocyanates is from 0.91:1 to 1.4:1, particularly preferably from 0.96:1 to 1.3:1, in particular from 1.05:1 to 1.25:1. This means that the silanes which have an isocyanate group are preferably regarded as additive for the purposes of the index, i.e. that the total index selected has been raised by the isocyanate groups of the silanes which have an isocyanate group.

As an alternative to the abovementioned process, the inventive crosslinkable TPUs may also be prepared by reacting thermoplastic polyurethane with silane which has an isocyanate group. In this process, the silanes which have an isocyanate group are linked to a previously prepared TPU. In this process, the TPU, preferably in a molten or softened state, particularly preferably in a molten state, may, by way of example, be reacted in an extruder with the silane. However, the silane groups are preferably integrated into the TPU before preparation of the TPU has been completed.

If the silane is present before the preparation of the TPU has been completed, the molar ratio of the isocyanates (a) to the silanes is preferably from 1:0.01 to 1:0.50.

If, as in the second alternative, previously prepared TPUs are modified using the silanes which have an isocyanate group, it is preferable to use from 0.001 to 0.2 mol, particularly from 0.01 to 0.2 mol, of silane for each 100 g of thermoplastic polyurethane.

Thermoplastic polyurethane is preferably a polyurethane-based thermoplastic elastomer.

Thermoplastic polyurethane used in particular comprises TPUs whose Shore hardness is from 50 A to 80 D. Preference is moreover given to TPUs having:

a modulus of elasticity of from 10 MPa to 10,000 MPa, measured to DIN EN ISO 527-2 on a test specimen of type A to DIN EN ISO 3167, using a test velocity of 1 mm/min. The modulus of elasticity is calculated as the ratio of tensile stress to tensile strain taken from the initial gradient of the tensile stress/tensile strain curve, and/or a glass transition temperature $T_g$, measured by means of DSC (at 10K/min) from below minus 10° C. for grades extending to a maximum of 64 Shore D, to below minus 40° C. for grades extending to a minimum of 85 Shore A, and/or a Charpy impact strength to DIN 53453 (DIN EN ISO 179) extending to minus 60° C. without fracture, and a notched impact strength of below minus 40° C. for grades below 95 Shore A, and below minus 20° C. for grades extending to a maximum of 60 Shore D, and/or a density to DIN 53479 or ISO 1183 of from 1.05 to 1.30 g/cm$^3$, and/or a tensile strength greater than 40 MPa, measured to DIN 53504 or ISO 37 for nonplasticized TPU grades, and/or a tear propagation resistance greater than 65 MPa for (un-plasticized) grades below 95 Shore A, and greater than 100 MPa for grades above 50 Shore D measured to DIN 53515 or ISO 34, and/or abrasion of less than 40 mm$^3$, measured to DIN 53516 or ISO 4649, and/or a compression set of from 30 to 70% at 70° C., measured to DIN 53517 or ISO 815.

These preferred properties are possessed by the TPU in the uncrosslinked state, i.e. with no crosslinking by way of the silane groups.

Processes for preparing thermoplastic polyurethanes, also termed TPUs in this specification, are well known. TPUs are generally prepared by reacting (a) isocyanates with (b) compounds reactive toward isocyanates and usually having a molar mass ($M_w$) of from 500 to 10000, preferably from 500 to 5000, particularly preferably from 800 to 3000, and with (c) chain extenders having a molar mass of from 50 to 499, if appropriate in the presence of (d) catalysts, and/or (e) conventional additives. As previously described at the outset, according to the invention use is also preferably made of the silanes.

The starting components and processes for preparing the preferred polyurethanes will be described below by way of example. The components (a), (b), and (c), and also, if appropriate, (d) and/or (e) usually used in preparing the polyurethanes will be described below by way of example:

a) Organic isocyanates (a) which may be used are well-known aliphatic, cycloaliphatic, araliphatic, and/or aromatic isocyanates, for example tri-, tetra-, Penta-, hexa-, hepta-, and/or octamethylene diisocyanate, 2-methylpenta-methylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophoron diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, and/or dicyclohexylmethane 4,4'-, 2,4'- and 2,2'-diisocyanate, diphenylmethane 2,2'-, 2,4'-, and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate, and/or phenylene diisocyanate. 4,4'-MDI is preferably used. In order to distinguish the isocyanates (a) from the silanes, isocyanates (a) are only those isocyanates which have no silane group. The isocyanates (a) are therefore defined as having no silane group.

b) Compounds (b) which may be used, these being reactive toward isocyanates, are the well-known compounds reactive toward isocyanates, for example polyesterols, polyetherols, and/or polycarbonatediols, these usually also being combined under the term "polyols", having molar masses of from 500 to 8000, preferably from 600 to 6000, in particular from 800 to less than 3000, and preferably having an average functionality toward isocyanates of from 1.8 to 2.3, preferably from 1.9 to 2.2, in particular 2. It is preferable to use polyether polyols, such as those based on well-known starter substances and on conventional alkylene oxides, e.g. ethylene oxide, propylene oxide, and/or butylene oxide, preference being given to polyetherols based on propylene 1,2-oxide and ethylene oxide, and in particular polyoxytetramethylene glycols. The polyetherols have the advantage of having greater hydrolysis resistance than polyesterols.

The polyetherols used may also comprise what are known as low-unsaturation polyetherols. For the purposes of this invention, low-unsaturation polyols are in particular polyether alcohols whose content of unsaturated compounds is less than 0.02 meg/g, preferably less than 0.01 meg/g.

These polyether alcohols are mostly prepared by addition reactions of alkylene oxides, in particular ethylene oxide, propylene oxide and mixtures of these onto triols or diols described above in the presence of high-activity catalysts. Examples of these high-activity catalysts are cesium hydroxide and multimetal cyanide catalysts, also termed DMC catalysts. A DMC catalyst often used is zinc hexacyanocobaltate. The DMC catalyst may be left in the polyether alcohol after the reaction, but is usually removed, for example by sedimentation or filtration.

It is also possible to use polybutadienediols with a molar mass of from 500 to 10000 g/mol, preferably from 1000 to 5000 g/mol, in particular from 2000 to 3000 g/mol. TPUs prepared using these polyols can be radiation-crosslinked after thermoplastic processing. This gives better combustion rate behavior, for example.

Instead of a polyol, it is also possible to use a mixture of various polyols.

c) The chain extenders (c) used comprise well-known aliphatic, araliphatic, aromatic and/or cycloaliphatic compounds having a molar mass of from 50 to 499, preferably difunctional compounds, such as diamines and/or alkanediols having from 2 to 10 carbon atoms in the alkylene radical, in particular 1,3-propanediol, 1,4-butanediol, 1,6-hexanediol, and/or di-, tri-, tetra-, penta-, hexa-, hepta-, octa-, nona- and/or decaalkylene glycols having from 3 to 8 carbon atoms, and preferably corresponding oligo- and/or polypropylene glycols, and use may also be made of a mixture of the chain extenders.

Components a) to c) are particularly preferably difunctional compounds, i.e. diisocyanates (a), difunctional polyols, preferably polyetherols (b), and difunctional chain extenders, preferably diols.

d) Suitable catalysts which in particular accelerate the reaction between the NCO groups of the diisocyanates (a) and the hydroxy groups of the structural components (b) and (c) are the conventional tertiary amines known from the prior art, e.g. triethylamine, dimethylcyclohexylamine, N-methylmorpholine, N,N'-dimethylpiperazine, 2-(dimethylaminoethoxy)ethanol, diazabicyclo[2.2.2]octane and the like, and also in particular organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like. The amounts usually used of the catalysts are from 0.0001 to 0.1 part by weight per 100 parts by weight of polyhydroxy compound (b).

e) Alongside catalysts (d), conventional auxiliaries and/or additives (e) may also be added to the structural components (a) to (c). By way of example, mention may be made of blowing agents, surface-active substances, fillers, nucleating agents, lubricants and mold-release agents, dyes and pigments, antioxidants, e.g. those active in relation to hydrolysis, light, heat, or discoloration, inorganic and/or organic fillers, flame retardants, reinforcing agents, plasticizers, and metal deactivators. In one preferred embodiment, hydrolysis stabilizers such as polymeric and low-molar mass carbodiimides are among component (e). The thermoplastic polyurethane particularly preferably comprises, within the inventive materials, melamine cyanurate, which acts as a flame retardant. The amount preferably used of melamine cyanurate is from 0.1 to 60% by weight, particularly preferably from 5 to 40% by weight, in particular from 15 to 25% by weight, based in each case on the total weight of the TPU. The thermoplastic polyurethane preferably comprises triazole and/or triazole derivative and antioxidants, their amount being from 0.1 to 5% by weight, based on the total weight of the thermoplastic polyurethane. Suitable antioxidants are generally substances which prevent or inhibit undesirable oxidative processes within the plastic to be stabilized. Antioxidants are generally available commercially. Examples of antioxidants are sterically hindered phenols, aromatic amines, thiosynergists, organophosphorus compounds of trivalent phosphorus, and hindered amine light stabilizers. Examples of sterically hindered phenols are found in Plastics Additive Handbook, 5th edition, H. Zweifel, ed., Hanser Publishers, Munich, 2001 ([1]), pp. 98-107 and pp. 116-121. Examples of aromatic amines are found in [1] pp. 107-108. Examples of thiosynergists are given in [1], pp. 104-105 and pp. 112-113. Examples of phosphites are found in [1], pp. 109-112. Examples of hindered amine light stabilizers are given in [1], pp. 123-136. Phenolic antioxidants are preferably suitable for use in the inventive antioxidant mixture. In one preferred embodiment, the antioxidants, in particular the phenolic antioxidants, have a molar mass greater than 350 g/mol, particularly preferably greater than 700 g/mol, and a maximum molar mass <10000 g/mol, preferably <3000 g/mol. They also preferably have a melting point below 180° C. Use may generally be made of any of the conventional amorphous or liquid stabilizers. It is also preferable to use antioxidants which are amorphous or liquid. Mixtures of two or more antioxidants may also be used as component (i).

Alongside the components mentioned: a), b) and c), and, if appropriate d) and e), use may also be made of chain regulators, usually having a molar mass of from 31 to 3000. These chain regulators are compounds which have only one functional group reactive toward isocyanates, examples being monofunctional alcohols, monofunctional amines, and/or monofunctional polyols. These chain regulators can be used for precise adjustment of flow behavior, in particular in the case of TPUs. The amount which may generally be used of chain regulators is from 0 to 5 parts by weight, preferably from 0.1 to 1 part by weight, based on 100 parts by weight of component b), these compounds being defined as part of component (c).

All of the molar masses mentioned in this specification have the unit [g/mol].

The molar ratios of the structural components (b) and (c) may be varied relatively widely in order to adjust the hardness of the TPUs. Molar ratios which have proven successful are from 10:1 to 1:10, in particular from 1:1 to 1:4, this being the ratio of component (b) to the entire amount to be used of chain extenders (c), and the hardness of the TPUs rises here as content of (c) increases.

The TPUs may be prepared continuously by the known processes, such as those using reactive extruders or the belt process, by the one-shot method or the prepolymer method, or batchwise by the known prepolymer process. In these processes, the components to be reacted: (a), (b), (c), and, if appropriate, (d) and/or (e) may be mixed with one another in succession or simultaneously, whereupon the reaction immediately begins.

In the extruder process, the structural components (a), (b), (c), and also, if appropriate, (d) and/or (e) are introduced into the extruder individually or in the form of a mixture, e.g. at temperatures of from 100 to 280° C., preferably from 140 to 250° C., and are reacted. The resultant TPU is usually extruded, cooled, and pelletized. After the synthesis, the TPU may, if appropriate, be modified by compounding in an extruder. By way of example, this compounding can modify the melt index of the TPU, or its pellet shape, to comply with the requirements.

Conventional processes, e.g. injection molding or extrusion, are used to process the TPUs prepared according to the invention, which usually take the form of pellets or powder, to give injection-molded or extruded items, e.g. the desired foils, moldings, rollers, fibers, automotive trim, hoses, cable plugs, folding bellows, drag cables, cable sheathing, gaskets, drive belts, or damping elements. These injection molding or extruded items may also be composed of compounded materials comprising the inventive TPU and at least one other thermoplastic, particularly a polyethylene, polypropylene, polyester, polyether, polystyrene, PVC, ABS, ASA, SAN, polyacrylonitrile, EVA, PBT, PET, polyoxymethylene. In particular, the TPU prepared according to the invention may be used to produce the items described at the outset. Other processes which may be used are the known powder-slush process, or calendering.

The silane-modified thermoplastic polyurethane is preferably spun by well-known methods to give fibers or extruded to give hoses, in particular compressed-air hoses, and the thermoplastic polyurethane is then preferably crosslinked by way of the silane groups, by means of moisture, if appropriate using a catalyst which accelerates the crosslinking process. The crosslinking reactions by way of and through the silane groups are well-known and familiar to the person skilled in the art. This crosslinking usually takes place through moisture, and may be accelerated by heat or by catalysts known for this purpose, e.g. Lewis acids, Lewis bases, Brönsted bases, Brönsted acids. The catalyst used for the crosslinking process, preferably by means of moisture, preferably comprises acetic acid, organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, such as dibutyltin diacetate, dibutyltin dilaurate. Particularly preferred compounds are stannous dilaurate and/or acetic acid.

The product crosslinked by way of the silane groups, in particular fibers based on thermoplastic polyurethane crosslinked by way of silane groups, preferably has the following advantages:

The heat distortion temperature is an important measure of the quality of an elastomer fiber. Surprisingly, it has been found that the heat distortion temperature of the melt-spun fiber crosslinked by way of silane groups was significantly improved. For example, the HDT of a fiber without inventive silane crosslinking is 120° C. (heat distortion temperature measured with 0.04 mN/dtex pre-tension; heating rate 10 K/min; test range from −100 to 250° C.). The HDT could be increased to 173° C. as a result of the crosslinking through the silane groups.

According to the invention, preference is therefore given to fibers based on the crosslinked inventive TPUs whose heat distortion temperature is above 140° C., preferably above 160° C., particularly preferably above 170° C., in particular from 171 to 260° C., measured with 0.04 mN/dtex pre-tension; heating rate 10 K/min, and test range from −100 to 250° C.

Another advantage of the inventive crosslinking of melt-spun elastomer fibers is improvement in resistance toward conventional spinning preparations. Contact with spinning preparations here causes attack, and sometimes complete breakdown of melt-spun fibers without inventive crosslinking, even at low temperatures (<120° C.), whereas inventive crosslinked fibers exhibit almost no damage even at temperatures above 190° C.

The examples below are intended to illustrate the present invention.

EXAMPLE 1

Addition of the Silane Compound to the TPU

Elastollan® E 1195 A, a TPU from Elastogran GmbH, was kneaded at 210° C. for 3 minutes in a twin-screw mixer. From 5 to 10% by weight of γ-isocyanatopropyltrimethoxysilane were then added, and kneading was continued at 210° C. for a further 6 minutes. The melt was cooled.

EXAMPLE 2

Addition of the Silane Compound to the TPU 2 and 4% by weight of γ-isocyanatopropyltrimethoxysilane were added to Elastollan® E 1195 A, a TPU from Elastogran GmbH, during processing in an extruder.

EXAMPLE 3

Preparation of the TPU with Silane

During preparation of Elastollan® E 1195 A by the hand-casting process, γ-isocyanatopropyltrimethoxysilane (5 and 10% by weight, based on the entire polymer composition) was mixed into the MDI. The resultant skin is processed to give injection-molded sheets.

EXAMPLE 4

Preparation of the TPU with Silane

During preparation of Elastollan® E 1195 A by the hand-casting process, γ-isocyanatopropyltrimethoxysilane (5 and 10% by weight, based on the entire polymer composition) was mixed into the MDI. Stannous dioctoate (5 and 10 ppm) was also added during the preparation process. The resultant skin is processed to give injection-molded sheets.

EXAMPLE 5

Preparation of the TPU with Silane

During preparation of Elastollan® C 78 A by the hand-casting process, γ-isocyanatopropyltriethoxysilane (5 and 10% by weight, based on the entire polymer composition) was mixed into the MDI. Stannous dioctoate (5 and 10 ppm) was also added during the preparation process. The resultant skin is processed to give injection-molded sheets.

EXAMPLE 6

Preparation of a TPU Comprising SDO (Stannous Dioctoate)

Elastollan® E 1195 A, a TPU from Elastogran GmbH, was placed in a twin-screw mixer and kneaded for 3 minutes at 210° C. 1 percent by weight of SDO was then added and the material was kneaded at 210° C. for a further 6 minutes. The melt was cooled.

EXAMPLE 7

Preparation of a TPU Comprising SDO (Stannous Dioctoate)

Elastollan® C 78 A, a TPU from Elastogran GmbH, was placed in a twin-screw mixer and kneaded for 3 minutes at 210° C. 1 percent by weight of SDO was then added and the material was kneaded at 210° C. for a further 6 minutes. The melt was cooled.

EXAMPLE 8

Preparation of the TPU with Silane

During preparation of Elastollan® E 1195 A by the hand-casting process, γ-isocyanatopropyltrimethoxysilane (5 and 10% by weight, based on the entire polymer composition) was mixed into the MDI. The resultant skin is comminuted and compounded with addition of from 2 to 5% of the material obtained in example 6. The resultant material is processed to give injection-molded sheets.

EXAMPLE 9

Preparation of the TPU with Silane

During preparation of Elastollan® C 78 A by the hand-casting process, γ-isocyanatopropyltriethoxysilane (5 and 10% by weight, based on the entire polymer composition) was mixed into the MDI. The resultant skin is comminuted and compounded with addition of from 2 to 5% of the material obtained in example 7. The resultant material is processed to give injection-molded sheets.

The materials obtained in examples 1, 2, and 3 were aged for 8-48 hours at 80° C. in an acidic solution (pH from 4 to 5). After this, more than 70% of the material was insoluble in DMF, and crosslinking had therefore taken place. The materials 4, 5, 6, and 7 were aged for 8-48 hours at 80° C. in water. After this, more than 80% of the material was insoluble in DMF, and crosslinking had therefore taken place.

EXAMPLE 10

Physical Properties

TABLE 1

Specimens of example 3, stress/strain values at room temperature and at 120° C.

| Content of γ-isocyanatopropyltrimethoxysilane | Test temperature | Sigma 5 in MPa | Sigma 10 in MPa | Sigma 20 in MPa | Sigma 50 in MPa |
|---|---|---|---|---|---|
| 0% | RT | 2.2 | 3.5 | 5.4 | 8.2 |
| 5% | RT | 3.4 | 5.4 | 7.5 | 10 |

TABLE 1-continued

Specimens of example 3, stress/strain values at room temperature and at 120° C.

| Content of γ-isocyanatopropyltrimethoxysilane | Test temperature | Sigma 5 in MPa | Sigma 10 in MPa | Sigma 20 in MPa | Sigma 50 in MPa |
|---|---|---|---|---|---|
| 0% | 120° C. | 1.1 | 1.6 | 2.2 | 3.1 |
| 5% | 120° C. | 2.1 | 3 | 3.8 | 4.5 |

The crosslinked TPU exhibited a higher level of stress/strain performance.

TABLE 2

Specimens of example 3, Vicat point and modulus of elasticity

| | | Test on injection-molded product | |
|---|---|---|---|
| γ-isocyanatopropyltrimethoxysilane [% by weight] | Hardness [Shore A] | Modulus of elasticity [MPa] | Vicat DIN EN ISO 306 (10 N/120K/h) [° C.] |
| 0 | 91 | 38 | 116 |
| 5 | 94 | 68 | 147 |
| 10 | 94 | 58 | 142 |

The crosslinked TPU exhibits higher Shore A hardness values, higher modulus of elasticity values, and a higher Vicat point.

The specimens according to example 3 were subjected to a hot-set test (based on EN 60811-2-1). The specimens were in each case loaded with various weights, using a cross section of 1 cm² at 180° C.

| γ-Isocyanato-propyltri-methoxysilane % | 180° C./100 g | | 180° C./200 g | | 180° C./300 g | | 180° C./400 g | |
|---|---|---|---|---|---|---|---|---|
| | 1st test % | 2nd test % | 1st test % | 2nd test % | 1st test % | 2nd test % | 1st test % | 2nd test % |
| 0 | break-off occurred | | break-off occurred | | break-off occurred | | break-off occurred | |
| 5 | 15 | 0 | 20 | 10 | 20 | 10 | 30 | 10 |

Fibers melt-spun from the TPUs having 5% of γ-isocyanatopropyltrimethoxysilane have the following properties: HDT of 173° C. (heat distortion temperature, measured with pre-tension of 0.04 mN/dtex; heating rate 10 K/min; test range from 100° C. to 250° C.).

We claim:

1. A process for preparing a silane-modified thermoplastic polyurethane, comprising
    reacting an isocyanate component and a component reactive toward isocyanates capable of forming a polyurethane therewith, wherein said isocyanate component comprises an aromatic isocyanate having no silane group and a silane which has only one isocyanate group.

2. The process according to claim 1, wherein the silane is at least one silane selected from the group consisting of γ-isocyanatopropyltrimethoxysilane, isocyanatomethyltrimethoxysilane, γ-isocyanatopropyltriethoxysilane, and isocyanatomethyltriethoxysilane.

3. The process according to claim 1, wherein the silane-modified thermoplastic polyurethane is spun to give fibers, or is extruded to give hoses, and then the thermoplastic polyurethane is crosslinked by way of the silane groups with moisture.

4. The process according to claim 3, wherein crosslinking is carried out with a catalyst which comprises a catalyst selected from the group consisting of Lewis acids, Lewis bases, Brönsted bases, and Brönsted acids.

5. The process according to claim 1, wherein the silane has the following structure:

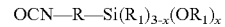

$$OCN-R-Si(R_1)_{3-x}(OR_1)_x$$

R is an aliphatic, araliphatic, or aromatic organic radical, having from 1 to 20 hydrocarbon atoms,
$R_1$ is an alkyl radical having from 1 to 10 carbon atoms,
x is 1, 2 or 3, wherein each $R_1$ may be the same or different.

6. The process according to claim 5, wherein R has from 2 to 10 carbon atoms, $R_1$ has 1 to 6 carbon atoms, and x is 2 or 3.

7. The process according to claim 6, wherein $R_1$ is methyl and/or ethyl, and x is 3.

8. The process according to claim 3, wherein the silane-modified thermoplastic polyurethane is spun to give fibers, which fibers have a heat distortion temperature of above 140° C., measured with 0.04 mN-dtex pre-tension, heating rate of 10 k/min, test range from −100 to 250° C.

9. The process according to claim 3, wherein the silane-modified thermoplastic polyurethane is spun to give fibers, which fibers have a heat distortion temperature of above 160° C., measured with 0.04 mN-dtex pre-tension, heating rate of 10 k/min, test range from −100 to 250° C.

10. The process according to claim 3, wherein the silane-modified thermoplastic polyurethane is spun to give fibers, which fibers have a heat distortion temperature of above 170° C., measured with 0.04 mN-dtex pre-tension, heating rate of 10 k/min, test range from −100 to 250° C.

11. The process according to claim 3, wherein the silane-modified thermoplastic polyurethane is spun to give fibers, which fibers have a heat distortion temperature of from 171 to 260° C., measured with 0.04 mN-dtex pre-tension, heating rate of 10 k/min, test range from −100 to 250° C.

12. The process according to claim 1, wherein the aromatic isocyanate having no silane group is diphenylmethane 4,4'-diisocyanate.

* * * * *